(12) United States Patent
Carrier et al.

(10) Patent No.: US 11,042,576 B2
(45) Date of Patent: Jun. 22, 2021

(54) IDENTIFYING AND PRIORITIZING CANDIDATE ANSWER GAPS WITHIN A CORPUS

(71) Applicant: International Business Machines Corporation, Armonk, NY (US)

(72) Inventors: Scott R. Carrier, Apex, NC (US); Aysu Ezen Can, Cary, NC (US); Brendan Bull, Durham, NC (US); Dwi Sianto Mansjur, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 168 days.

(21) Appl. No.: 16/212,676

(22) Filed: Dec. 6, 2018

(65) Prior Publication Data

US 2020/0183962 A1 Jun. 11, 2020

(51) Int. Cl.
| | |
|---|---|
| *G06F 16/332* | (2019.01) |
| *G06F 16/33* | (2019.01) |
| *G06N 20/00* | (2019.01) |
| *G10L 15/14* | (2006.01) |
| *G06N 5/02* | (2006.01) |
| *G06F 40/242* | (2020.01) |

(52) U.S. Cl.
CPC ...... *G06F 16/3329* (2019.01); *G06F 16/3334* (2019.01); *G06F 40/242* (2020.01); *G06N 5/02* (2013.01); *G06N 20/00* (2019.01); *G10L 15/14* (2013.01)

(58) Field of Classification Search
None
See application file for complete search history.

(56) References Cited

U.S. PATENT DOCUMENTS

| | | | |
|---|---|---|---|
| 8,346,701 B2 | 1/2013 | Wang et al. | |
| 9,400,841 B2 | 7/2016 | Eggebraaten et al. | |
| 9,400,956 B2 | 7/2016 | Eggebraaten et al. | |
| 2008/0235203 A1* | 9/2008 | Case | G06F 16/3338 |
| 2009/0089044 A1* | 4/2009 | Cooper | G06F 40/30 704/9 |
| 2009/0292687 A1* | 11/2009 | Fan | G06N 5/04 |

(Continued)

OTHER PUBLICATIONS

Anonymous; "A Self-Diagnosing Question Answering System"; IP.com No. IPCOM000247244D; IP.com Electronic Publication Date: Aug. 17, 2016. pp. 1-6.

(Continued)

*Primary Examiner* — Antim G Shah
(74) *Attorney, Agent, or Firm* — Reza Sarbakhsh

(57) ABSTRACT

Methods and apparatus, including computer program products, implementing and using techniques for identifying candidate answer gaps within a corpus of a question and answer system. An original question posed to the question and answer system is analyzed to identify an object and a semantic type for the question. Concepts having a same or similar semantic type are retrieved from an ontology or dictionary. For at least one retrieved concept, one or more altered questions are created by replacing the object of the original question with a preferred term of the retrieved concept. The one or more altered questions are submitted to the question and answer system. The answers to the altered questions are analyzed to identify gaps within the corpus of the question and answer system.

11 Claims, 4 Drawing Sheets

(56) References Cited

U.S. PATENT DOCUMENTS

2013/0041921 A1* 2/2013 Cooper .............. G06F 16/3338
707/780
2014/0120513 A1* 5/2014 Jenkins .................. G06F 40/20
434/362
2015/0074095 A1* 3/2015 Enders .............. G06F 16/24578
707/725

OTHER PUBLICATIONS

Anonymous; "Automatic Error Analysis Advisor for Question Answering Systems"; IP.com No. IPCOM000247245D; IP.com Electronic Publication Date: Aug. 17, 2016. pp. 1-6.

Anonymous; "Automatic, In-Domain, Question/Answer-Set Generation"; IP.com No. IPCOM000245124D; IP.com Electronic Publication Date: Feb. 10, 2016. pp. 1-5.

Anonymous; "Method to Identify New Source Documents and Enlarge Corpora in Question-Answer Systems by Automated Stylistic Evaluation of Un-curated Text"; IP.com No. IPCOM000245360D; IP.com Electronic Publication Date: Mar. 3, 2016. pp. 1-3.

Cabrio, E. et al.; "Question Answering Based Annotation for a Corpus of Spoken Requests"; FBK-irst, 2 University of Trento—38050 Povo (Trento), Italy. 2015-2016. pp. 108.

* cited by examiner

IDENTIFYING AND PRIORITIZING CANDIDATE ANSWER GAPS WITHIN A CORPUS

BACKGROUND

The present invention relates to Question and Answer (QA) systems, and more specifically, to how to address information gaps in QA systems. QA is a computer science discipline within the fields of information retrieval and Natural Language Processing (NLP), which is concerned with building systems that automatically answer questions posed by humans in a natural language.

A QA implementation, usually a computer program, may construct its answers by querying a structured database of knowledge or information, usually a knowledge base. More commonly, QA systems can pull answers from an unstructured collection of natural language documents. Some examples of natural language document collections used for QA systems include:
  a local collection of reference texts
  internal organization documents and web pages
  compiled newswire reports
  a set of Wikipedia pages
  a subset of World Wide Web pages.

A QA system is dependent on a good search corpus, since without documents containing the answers, there is little any QA system can do. It thus makes sense that larger collection sizes generally lend well to better QA performance. For at least this reason, it is imperative for a corpus to contain sufficient data to answer the myriad of questions that may be posed by end users. It is therefore also very important to be able to pro-actively identify gaps within a corpus that would prohibit a QA system from answering a question that is likely to be posed by an end user, prior to the question being asked and an insufficient answer being returned by the system.

SUMMARY

According to one embodiment of the present invention, methods, systems and computer program products are provided for identifying candidate answer gaps within a corpus of a question and answer system. An original question posed to the question and answer system is analyzed to identify an object and a semantic type for the question. Concepts having a same or similar semantic type are retrieved from an ontology or dictionary. For at least one retrieved concept, one or more altered questions are created by replacing the object of the original question with a preferred term of the retrieved concept. The one or more altered questions are submitted to the question and answer system. The answers to the altered questions are analyzed to identify gaps within the corpus of the question and answer system.

The details of one or more embodiments of the invention are set forth in the accompanying drawings and the description below. Other features and advantages of the invention will be apparent from the description and drawings, and from the claims.

BRIEF DESCRIPTION OF THE DRAWINGS

Like reference symbols in the various drawings indicate like elements.

DETAILED DESCRIPTION

The various embodiments of the invention pertain to techniques for pro-actively identifying and prioritizing gaps within a corpus of a QA system. In accordance with various embodiments, this is done via translating questions posed to the QA system into a template. This allows variations of a particular question to be generated and to be posed to the system in the background, with the cumulative results being analyzed to identify gaps in the sense that certain variations of a question can be answered while others cannot. It is possible to have high confidence in the prioritization of these gaps, for example, based on the frequency and similarity of questions posed to the QA system, since they are discovered via variations of real-world questions posed to the QA system.

Figure 1:
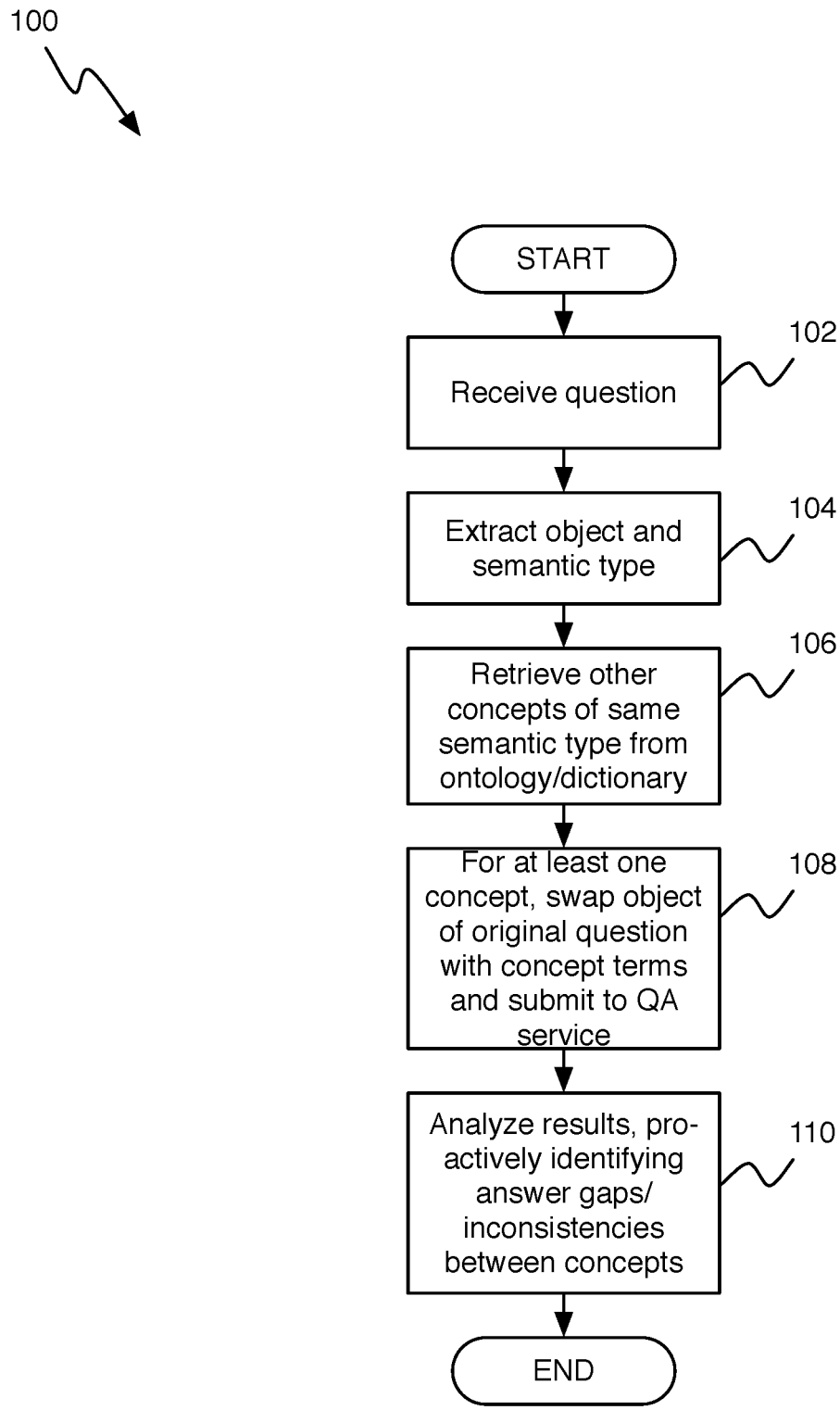
FIG. 1 shows a process 100 for identifying and prioritizing gaps within a corpus of a QA system, in accordance with one embodiment.
Figure 2:
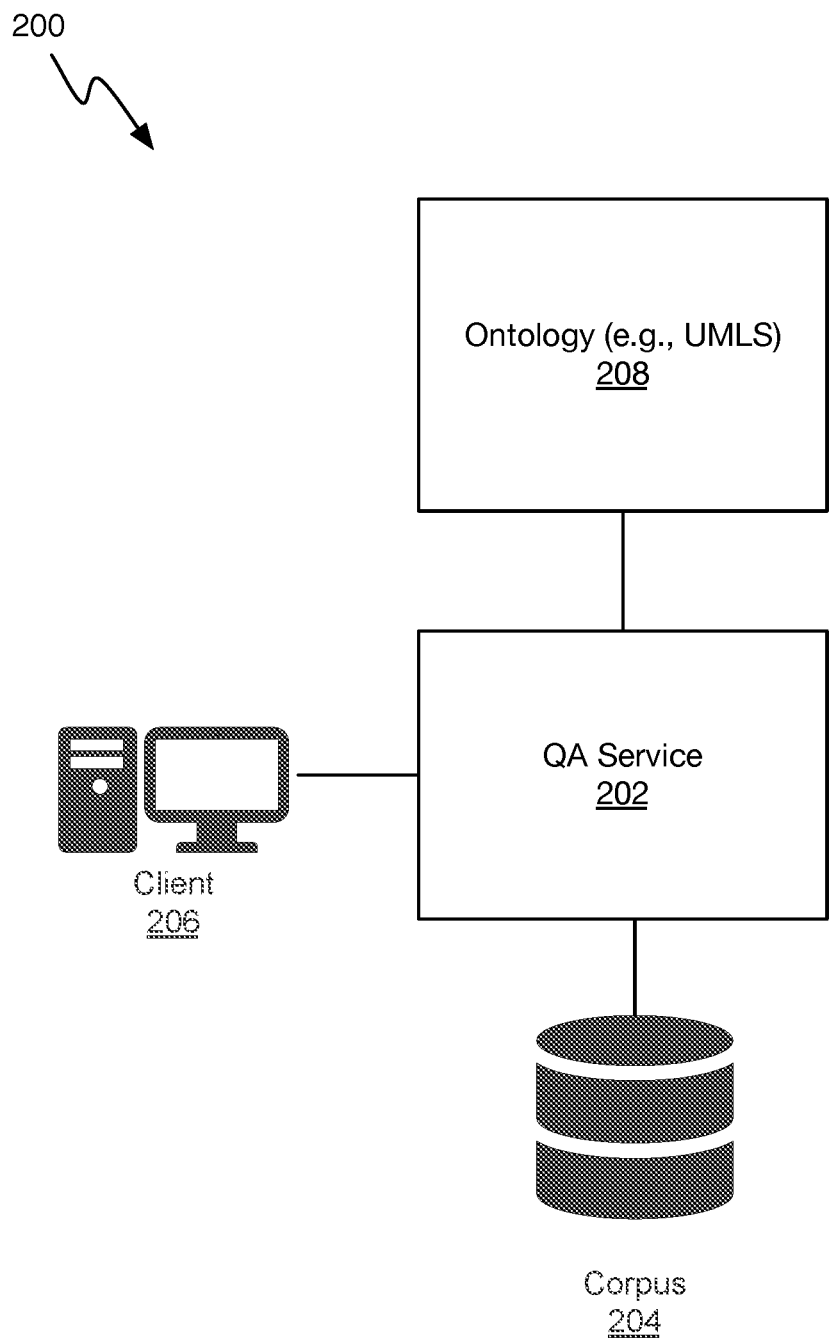
FIG. 2 shows a QA service 200, in accordance with one embodiment.

With reference now to FIGS. 1 and 2, a process 100 for identifying and prioritizing gaps within a corpus of a QA system 200 will now be described, in accordance with one embodiment. As can be seen in FIG. 1, the process 100 starts by the QA service 202 of the QA system 200 shown in FIG. 2 receiving a question from a user 206, for example "What are the side effects of Cisplatin?," step 102.

The object and semantic type of the received question is then extracted, step 104, by the QA service 202. Given a question, the object is identified along with the semantic types of annotations over the object. As is well known to those having ordinary skill in the art, semantic types describe an annotation, for example, a "Medication" vs. a "Procedure" semantic type. It should also be noted that there may be situations in which an object has multiple annotations, and each annotation could—and most likely would—have different semantic types.

Figure 4:
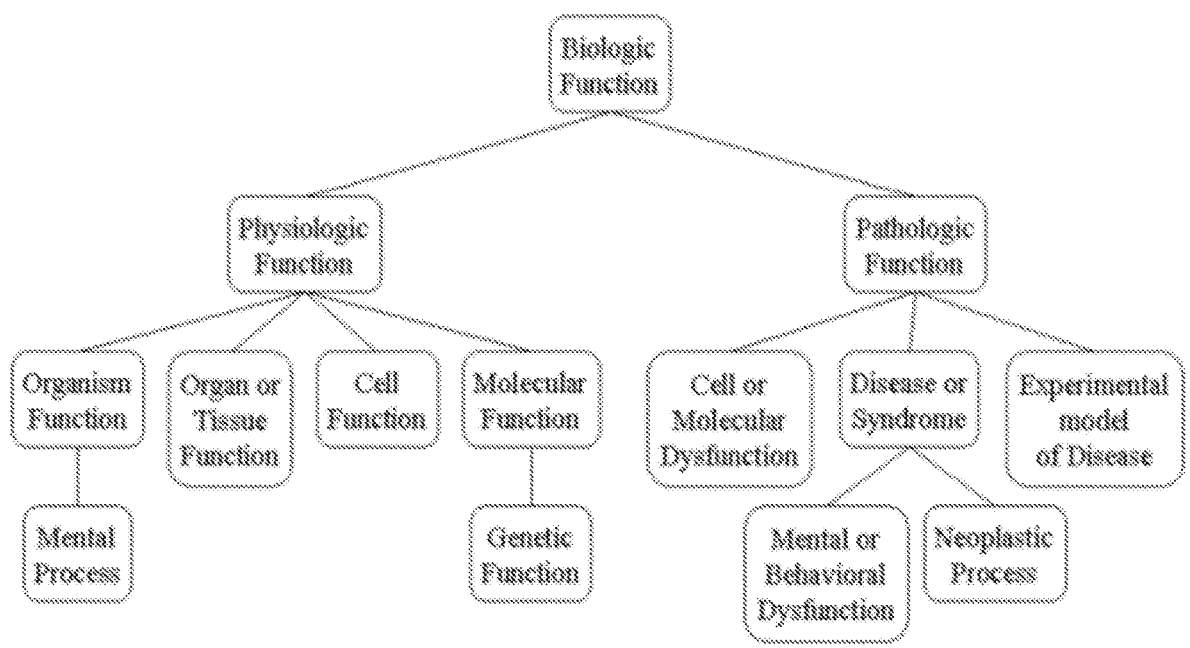
FIG. 4 shows an example of such a semantic type hierarchy 400, from the Unified Medical Language system (UMLS).

Next, other concepts of the same semantic type (e.g. Pharmacologic Substance) are retrieved from an ontology/dictionary 208, step 106. FIG. 4 shows an example of such a semantic type hierarchy 400, from the Unified Medical Language system (UMLS). In accordance with the various embodiments, the semantic types do not have to be the same type, but they should be similar. In a basic embodiment, these other semantic types can be obtained, for example, by retrieving the children and possibly the parents of a given semantic type within an ontology graph. These are typically isA ("is a") relationships. For example, "Organism Function" is a "Physiologic Function," as shown in FIG. 4. However, as the skilled person realizes, there may be many other types of more complex relationships than an isA relationship.

After retrieving the other concepts of the same semantic type, the object of the original question is swapped with at least one of the retrieved with concept terms, and the altered question is submitted to the QA service 202, step 108. That is, from the list of concepts, the object of the original question is replaced by a preferred term of at least one concept and submitted to the QA service 202. In some embodiments, the object of the original question is swapped with each of the retrieved concept terms and the alterd questions are submitted to the QA service 202. In Natural Language Processing (NLP), there are a variety of terms (text) that can mean the same thing. The "preferred term," as used herein, is the normalized term for a concept, regardless of how the term was expressed in the text. The other terms are defined as "surface forms." For example, "Low-Density Lipoproteins" is the preferred term, whereas "LDL" or "beta lipoprotein" might be considered other surface forms of that same concept. In the present example, where the original question is "What are the side effects of Cisplatin?," the general question might be "What are the side effects of <PHARMACOLOGICAL SUBSTANCE>?." After retrieving concept terms, the following questions may be generated: "What are the side effects of Fludarabine?," "What are the side effects of Cytarabine?, "What are the side effects of . . . ?," etc.

Next, the answers received from the QA Service 202 are pro-actively analyzed to identify answer gaps and/or inconsistencies between the concepts, step 110. In one embodiment, the analysis proceeds in the background as new questions are received to the QA system 200, to pro-actively identify three key data points:

1. How does the candidate answer confidence of the user question compare to the candidate answer confidence of similar concepts within a corpus, that is, how answer-able was the question and similar questions that might be posed to the system in the future? The way in which the confidence is measured can vary depending on the specific embodiment at hand. In one exemplary embodiment, it is based on a statistical score from one or more machine learning models. For example, features such as the volume of evidence procured for a given answer, the source of the evidence, date, the level of clarity or ambiguity in the question itself, etc., may be considered in determining the confidence.
2. Where are the candidate answer gaps within a corpus? Perhaps the corpus supports an adequate answer confidence for inquiries about a subset of medications, but is deemed to be lacking in other similar medications. For example, as different medications are swapped out, and the question is reposed to the system, the net results of how well a system is able to answer the same question against different medications will indicate the coverage of the side effects of a given medication. For a given class of medications, it may be possible to answer the question for most of those medications, but perhaps for a different class of medications, the corpus lacks the information to determine those side effects. Given the same question with different medication substituted, what percentage can be accurately answered? If it is possible to confidently answer the question against 80% of the substituted medications, say, then it may be concluded that the corpus is mostly capable of answering that questions, and perhaps the 20% non-high-confident medications should be further analyzed to determine whether additional sources should be added to the corpus. Conversely, if only 20% of the substituted medications questions can be answered with high-confidence, either there is a significant gap in the corpus (i.e. data from which the answer can be sourced) or the question may have been ill posed or outside the scope of the answers that the corpus is intended to answer. As the skilled person realizes, these are merely examples of one method of identifying answer gaps. The percentages may vary depending on the particular implementations, and there may be other alternative ways of identifying gaps in the corpus.
3. Frequency and degree of similarity of question compared to previously posed questions are factored into the prioritization of candidate answer gaps to be filled, i.e., how likely is a user to be dissatisfied with an answer, given the likelihood a candidate answer gap is to be encountered. In some embodiments, a set of questions that are topically similar may be clustered, for example. At a high level, questions can be clustered by semantic type, and then within these clusters, there may be further clustering based on artifacts, such as the focus of a question (i.e., the term(s) a person would substitute with the answer to find additional evidence). In some embodiments, questions with similar semantic types over both the object and subject may be identified, etc. Real-world questions submitted by actual users of the system can be leveraged and quantified to aid in the prioritization of candidate answer gaps. That is, in some embodiments, the system may prioritize questions received from actual users, rather than the solution providers coming up with questions on their own to determine gaps in the corpus.

This ends the process 100. Once the information about the "gaps" in the corpus have been obtained, they can be filled in using techniques that are familiar to those having ordinary skill in the art, thereby improving the QA system's 200 ability to answer questions received from users 206.

In certain embodiments, the semantic types can be mapped to an ontology (e.g. UMLS, as shown in FIG. 4), and the analysis can be stratified according to the positional hierarchy (i.e. granularity) of the concepts. That is, the specificity of a substituted term can be factored into the gap analysis of a corpus. For example, consider the term "lung disease" vs. "Idiopathic Pulmonary Fibrosis." The latter has an isA relationship with the former, but a concepts position in the ontology graph hierarchy can be leveraged to identify how a system performs based on the vagueness or specificity of the terms that are resubmitted through the system. For example, it might be expected that an overly vague terms does not yield a high-confidence answer, or vice-versa.

Figure 3:
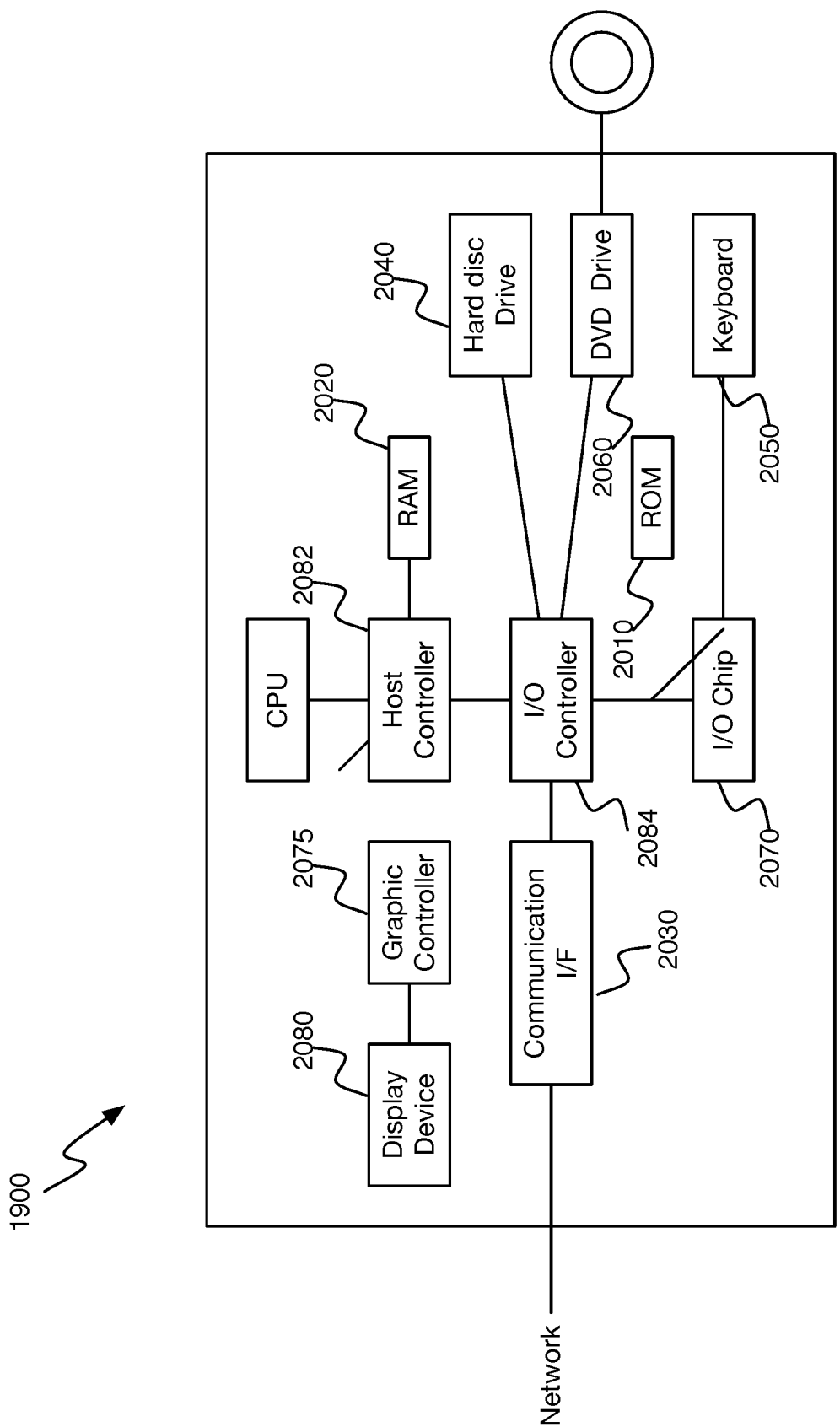
FIG. 3 shows a computer system 1900 in which a QA service can be implemented, in accordance with one embodiment.

FIG. 3 shows an exemplary configuration of a computer 1900 in accordance with one embodiment. The computer 1900 according to the present embodiment includes a CPU 2000, a RAM 2020, a graphics controller 2075, and a display apparatus 2080 which are mutually connected by a host controller 2082. The computer 1900 also includes input/output units such as a communication interface 2030, a hard disk drive 2040, and a DVD-ROM drive 2060 which are connected to the host controller 2082 via an input/output controller 2084. The computer also includes legacy input/output units such as a ROM 2010 and a keyboard 2050 which are connected to the input/output controller 2084 through an input/output chip 2070.

The host controller 2082 connects the RAM 2020 with the CPU 2000 and the graphics controller 2075 which access the RAM 2020 at a high transfer rate. The CPU 2000 operates according to programs stored in the ROM 2010 and the RAM 2020, thereby controlling each unit. The graphics controller 2075 obtains image data generated by the CPU 2000 on a frame buffer or the like provided in the RAM 2020, and causes the image data to be displayed on the display apparatus 2080. Alternatively, the graphics controller 2075 may contain therein a frame buffer or the like for storing image data generated by the CPU 2000.

The input/output controller 2084 connects the host controller 2082 with the communication interface 2030, the hard disk drive 2040, and the DVD-ROM drive 2060, which are relatively high-speed input/output units. The communication interface 2030 communicates with other electronic devices via a network. The hard disk drive 2040 stores programs and data used by the CPU 2000 within the computer 1900. The DVD-ROM drive 2060 reads the programs or the data from the DVD-ROM 2095, and provides the hard disk drive 2040 with the programs or the data via the RAM 2020.

The ROM 2010 and the keyboard 2050 and the input/output chip 2070, which are relatively low-speed input/output units, are connected to the input/output controller 2084. The ROM 2010 stores therein a boot program or the like executed by the computer 1900 at the time of activation, a program depending on the hardware of the computer 1900. The keyboard 2050 inputs text data or commands from a user, and may provide the hard disk drive 2040 with the text data or the commands via the RAM 2020. The input/output chip 2070 connects a keyboard 2050 to an input/output controller 2084, and may connect various input/output units via a parallel port, a serial port, a keyboard port, a mouse port, and the like to the input/output controller 2084.

A program to be stored on the hard disk drive 2040 via the RAM 2020 is provided by a recording medium as the DVD-ROM 2095, and an IC card. The program is read from the recording medium, installed into the hard disk drive 2040 within the computer 1900 via the RAM 2020, and executed in the CPU 2000.

A program that is installed in the computer 1900 and causes the computer 1900 to function as an apparatus implementing the process 100 of FIG. 1, includes a SIEM Risk Management module.

The information processing described in these programs is read into the computer 1900, to function as the determining section, which is the result of cooperation between the program or module and the above-mentioned various types of hardware resources. Moreover, the apparatus is constituted by realizing the operation or processing of information in accordance with the usage of the computer 1900.

For example, when communication is performed between the computer 1900 and an external device, the CPU 2000 may execute a communication program loaded onto the RAM 2020, to instruct communication processing to a communication interface 2030, based on the processing described in the communication program. The communication interface 2030, under control of the CPU 2000, reads the transmission data stored on the transmission buffering region provided in the recording medium, such as a RAM 2020, a hard disk drive 2040, or a DVD-ROM 2095, and transmits the read transmission data to a network, or writes reception data received from a network to a reception buffering region or the like provided on the recording medium. In this way, the communication interface 2030 may exchange transmission/reception data with the recording medium by a DMA (direct memory access) method, or by a configuration that the CPU 2000 reads the data from the recording medium or the communication interface 2030 of a transfer destination, to write the data into the communication interface 2030 or the recording medium of the transfer destination, so as to transfer the transmission/reception data.

In addition, the CPU 2000 may cause all or a necessary portion of the file of the database to be read into the RAM 2020, such as by DMA transfer, the file or the database having been stored in an external recording medium such as the hard disk drive 2040, the DVD-ROM drive 2060 (DVD-ROM 2095) to perform various types of processing onto the data on the RAM 2020. The CPU 2000 may then write back the processed data to the external recording medium by means of a DMA transfer method or the like. In such processing, the RAM 2020 can be considered to temporarily store the contents of the external recording medium, and so the RAM 2020, the external recording apparatus, and the like are collectively referred to as a memory, a storage section, a recording medium, a computer readable medium, etc. Various types of information, such as various types of programs, data, tables, and databases, may be stored in the recording apparatus, to undergo information processing. Note that the CPU 2000 may also use a part of the RAM 2020 to perform reading/writing thereto on the cache memory. In such an embodiment, the cache is considered to be contained in the RAM 2020, the memory, and/or the recording medium unless noted otherwise, since the cache memory performs part of the function of the RAM 2020.

The CPU 2000 may perform various types of processing, onto the data read from the RAM 2020, which includes various types of operations, processing of information, condition judging, search/replace of information, etc., as described in the present embodiment and designated by an instruction sequence of programs, and writes the result back to the RAM 2020. For example, when performing condition judging, the CPU 2000 may judge whether each type of variable shown in the present embodiment is larger, smaller, no smaller than, no greater than, or equal to the other variable or constant, and when the condition judging results in the affirmative (or in the negative), the process branches to a different instruction sequence, or calls a sub routine.

In addition, the CPU 2000 may search for information in a file, a database, etc., in the recording medium. For example, when a plurality of entries, each having an attribute value of a first attribute is associated with an attribute value of a second attribute, are stored in a recording apparatus, the CPU 2000 may search for an entry matching the condition whose attribute value of the first attribute is designated, from among the plurality of entries stored in the recording medium, and reads the attribute value of the second attribute stored in the entry, thereby obtaining the attribute value of the second attribute associated with the first attribute satisfying the predetermined condition.

The above-explained program or module may be stored in an external recording medium. Exemplary recording mediums include a DVD-ROM 2095, as well as an optical recording medium such as a Blu-ray Disk or a CD, a magneto-optic recording medium such as a MO, a tape medium, and a semiconductor memory such as an IC card. In addition, a recording medium such as a hard disk or a RAM provided in a server system connected to a dedicated communication network or the Internet can be used as a recording medium, thereby providing the program to the computer 1900 via the network.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for identifying candidate answer gaps within a corpus of a question and answer system, comprising:
    analyzing an original question posed to the question and answer system to identify an object and a semantic type for the question;
    retrieving, from an ontology or dictionary, concepts having a same or similar semantic type;

for at least one retrieved concept, creating one or more altered questions by replacing the object of the original question with a normalized term of the retrieved concept;

submitting the one or more altered questions to the question and answer system; and analyzing answers to the altered questions to identify gaps within the corpus of the question and answer system, wherein analyzing answers comprises determining how a confidence of an answer to the original question compares to confidences of answers to the altered questions, and wherein the confidence is based on a statistical score from one or more machine learning models.

2. The method of claim 1, further comprising:

filling the identified gaps within the corpus in a prioritized order based on one or more of:

a frequency of a question posed to the question and answer system by users, and a similarity of a question posed to the question and answer system by users.

3. The method of claim 1, wherein the retrieving, submitting, and analyzing steps occur in the background as other questions from users are answered by the questions and answer system.

4. The method of claim 1, wherein the concepts having a same or similar semantic type include children or parents of the semantic type within an ontology graph.

5. The method of claim 1, wherein analyzing answers comprises:

determining how adequately individual altered questions are answered by the corpus of the question and answer system to identify gaps for specific terms within the corpus.

6. A computer program product for identifying candidate answer gaps within a corpus of a question and answer system, the computer program product comprising a computer readable storage medium having program instructions embodied therewith, wherein the computer readable storage medium is not a transitory signal per se, the program instructions being executable by a processor to cause the processor to perform a method comprising:

analyzing an original question posed to the question and answer system to identify an object and a semantic type for the question;

retrieving, from an ontology or dictionary, concepts having a same or similar semantic type;

for at least one retrieved concept, creating one or more altered questions by replacing the object of the original question with a normalized term of the retrieved concept;

submitting the one or more altered questions to the question and answer system; and analyzing answers to the altered questions to identify gaps within the corpus of the question and answer system, wherein analyzing answers comprises determining how a confidence of an answer to the original question compares to confidences of answers to the altered questions, wherein the confidence is based on a statistical score from one or more machine learning models.

7. The computer program product of claim 6, further comprising program instructions to cause the processor to:

fill the identified gaps within the corpus in a prioritized order based on one or more of: a frequency of a question posed to the question and answer system by users, and a similarity of a question posed to the question and answer system by users.

8. The computer program product of claim 6, wherein the retrieving, submitting, and analyzing steps occur in the background as other questions from users are answered by the questions and answer system.

9. The computer program product of claim 6, wherein the concepts having a same or similar semantic type include children or parents of the semantic type within an ontology graph.

10. The computer program product of claim 6, wherein analyzing answers comprises:

determining how adequately individual altered questions are answered by the corpus of the question and answer system to identify gaps for specific terms within the corpus.

11. A question and answer system for identifying candidate answer gaps within a corpus, comprising:

a question and answer service module including a processor;

a corpus; and a memory, wherein the memory contains instructions that when executed by the processor cause the following method to be performed:

analyzing an original question posed to the question and answer system to identify an object and a semantic type for the question;

retrieving, from an ontology or dictionary, concepts having a same or similar semantic type;

for at least one retrieved concept, creating one or more altered questions by replacing the object of the original question with a normalized term of the retrieved concept;

submitting the one or more altered questions to the question and answer system; and analyzing answers to the altered questions to identify gaps within the corpus of the question and answer system, wherein analyzing answers comprises determining how a confidence of an answer to the original question compares to confidences of answers to the altered questions, wherein the confidence is based on a statistical score from one or more machine learning models.

* * * * *